United States Patent [19]

Lynch et al.

[11] Patent Number: 5,199,980
[45] Date of Patent: Apr. 6, 1993

[54] POLYURETHANE-BASED WATER-IN-WATER MULTICOLOR PAINT AND METHOD FOR MAKING

[75] Inventors: James F. Lynch, Schaumburg; John Predkelis, Glen Ellyn, both of Ill.

[73] Assignee: Multicolor Specialties, Inc., Cicero, Ill.

[21] Appl. No.: 851,525

[22] Filed: Mar. 16, 1992

Related U.S. Application Data

[63] Continuation-in-part of Ser. No. 694,311, May 1, 1991, Pat. No. 5,114,485, which is a continuation-in-part of Ser. No. 586,762, Sep. 21, 1990, Pat. No. 5,114,484.

[51] Int. Cl.$^5$ .............................................. C09D 5/29
[52] U.S. Cl. ....................... 106/311; 106/124; 106/163.1; 106/170; 106/190; 106/191; 106/203; 106/204; 106/209; 106/253; 106/401; 106/468; 106/482; 106/26 R
[58] Field of Search ................ 106/24, 26, 27, 28, 106/29, 30, 32, 124, 163.1, 170, 190, 191, 203, 204, 209, 253, 311, 401, 468, 482

[56] References Cited

U.S. PATENT DOCUMENTS

| | | | |
|---|---|---|---|
| 3,370,024 | 2/1968 | Grasko et al. | 106/170 |
| 3,811,904 | 5/1974 | Zola | 106/288 |
| 3,852,076 | 12/1974 | Grasko | 106/26 |
| 3,950,283 | 4/1976 | Sellars et al. | 106/170 |
| 4,376,654 | 3/1983 | Zola | 106/170 |

FOREIGN PATENT DOCUMENTS 1298201 11/1972 United Kingdom .

Primary Examiner—William R. Dixon, Jr.
Assistant Examiner—Scott L. Hertzog
Attorney, Agent, or Firm—Olson & Hierl, Ltd.

[57] ABSTRACT

A polyurethane-based water-in-water multicolor paint composition is provided having a disperse phase and a continuous phase. The disperse phrase preferably is comprised of a water dispersible, film-forming, cross-linkable, polyurethane polymer system; hydroxy (lower alkyl) cellulose; quaternized water soluble cellulose ether; peptized clay; and water. The continuous phase preferably is comprised of such a polyurethane polymer system, a peptized clay and water. Methods for preparing the paint are also provided.

27 Claims, 1 Drawing Sheet

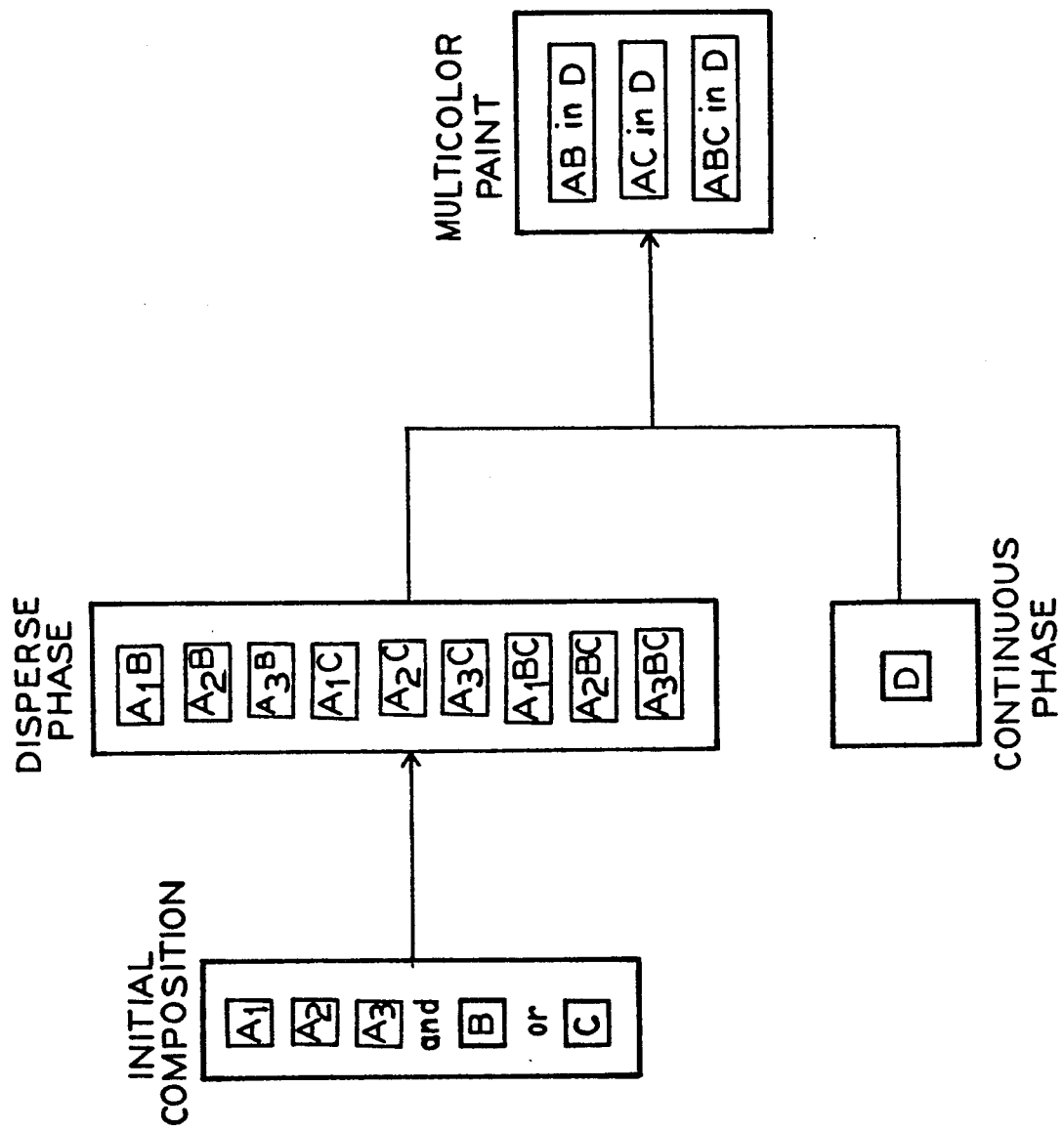

POLYURETHANE-BASED WATER-IN-WATER MULTICOLOR PAINT AND METHOD FOR MAKING

CROSS-REFERENCE TO RELATED APPLICATION

This application is a continuation-in-part of application Ser. No. 694,311, filed May 1, 1991, now U.S. Pat. No. 5,114,485, which in turn is a continuation-in-part of application Ser. No. 586,762, filed Sep. 21, 1990, now U.S. Pat. No. 5,114,484.

FIELD OF THE INVENTION

The present invention relates to a polyurethane-based water-in-water multicolor paint emulsion which can be applied as a surface coating with a paint roller, a brush or spray equipment.

BACKGROUND OF THE INVENTION

A multicolor paint is a composition which, when coated on a surface and dried, results in a coating that is characterized by dispersed discrete visibly discernible spots (or dots). Water-in-water multicolor paints have been proposed (see, for example, Sellars et al. U.S. Pat. No. 3,950,283, Grasko U.S. Pat. No. 3,852,076 and Zola U.S. Pat. No. 4,376,654) and are of commercial interest particularly in view of the developing governmental interest in establishing regulations limiting the quantity of organic volatiles emitted into the environment by a paint during application and subsequent air drying. The states of California, New Jersey and New York, for example, have adopted regulations limiting paint emissions and many other states reportedly will be adopting similar regulations.

It is difficult to prepare a commercially acceptable water-in-water multicolor paint because of various problems. One problem is the fact that the discrete color bodies comprising the disperse phase in such a paint need to contain a relatively high concentration of a water soluble, film-forming polymer in order to achieve commercially acceptable characteristics in the resulting coating. Another problem is that such polymers should be in a highly water insoluble state after the paint has been coated and dried; otherwise, the coated and dried paint provides little or no water resistance. Another problem is to prepare and utilize a disperse phase composition which can be formed into discrete color bodies that have sufficient structural integrity in the continuous phase of the paint for practical commercial purposes. Structurally weak, discrete color bodies would break up easily and become part of this continuous phase.

Prior art multicolor paints commonly contain a solution or dispersion of a film-forming polymer in an organic liquid carrier with the polymer being, for example, nitrocellulose or styrene butadiene, and the carrier liquid being mineral spirits or the like. However, the solubility and dispersability of the polymers in water is so limited as to make it impossible to use the polymers in making a water-based paint of commercially acceptable quality. It is also not practical to "fortify" the water with a water-miscible organic cosolvent to enhance polymer solubility or dispersability because the maximum amount of the organic cosolvent which can be present should be kept below about 7-8 weight percent on a total product paint composition basis in order to comply with the foregoing proposed regulatory standards.

So far as now known, no one has previously succeeded in preparing a water-in-water multicolor paint wherein the aqueous disperse phase color bodies are characterized by having:

(a) a relatively high content of water dispersible, film-forming, crosslinkable polymer in association with a crosslinking agent, (b) a relatively high structural integrity, and (c) a capacity to form highly crosslinked, water insoluble, chemical resistant, mar resistant and thermally stable coatings with a high degree of hardness after paint application and drying.

Previously, in the above-referenced parent patent applications, water-in-water multicolor paints based upon crosslinkable carboxylated polymers were provided which overcame the prior art problems and which had the foregoing characteristics. However, it has been further discovered that improved water-in-water multicolor paints can also be made based upon crosslinkable polyurethane polymers.

SUMMARY OF THE INVENTION

The present invention provides an improved water-in-water multicolor paint having a continuous phase and a disperse phase, and wherein disperse phase bodies have the foregoing combination of characteristics. The invention further provides improved multicolored surface coatings produced from the application and drying of the multicolor paint.

In the disperse phase bodies, there is incorporated a mixture of polymeric materials comprised of:

(a) water dispersed, film-forming, crosslinkable polyurethane polymer system, and (b) hydroxy (lower alkyl) cellulose and/or alkali metal carboxyl (lower alkyl) cellulose.

Also, a pigment is optionally but preferably present in the disperse phase bodies.

Further present in the disperse or discontinuous phase bodies is at least one of either a quaternized cellulose ether, or an aqueous gel that is comprised of a water swellable clay, a peptizing agent and water. Preferably both such materials are present. When an aqueous gel is present, the water swellable clay is preferably a synthetic hectorite clay and the peptizing agent is preferably tetrasodium pyrophosphate. These agents not only thicken, but also improve the structural integrity of the disperse phase bodies.

Optionally, but preferably, also present in the discontinuous phase bodies are conventional paint additives including plasticizers, silicone bonding agents, antifoaming agents, wetting agents, and/or the like.

The disperse phase bodies are dispersed in a continuous phase that comprises an aqueous gel which is comprised of a vehicle which includes a film-forming dispersed, crosslinkable polyurethane polymer system, a peptized clay and optionally a pigment. The clay is preferably a synthetic hectorite clay, and the peptizing agent is preferably tetrasodium pyrophosphate.

The use of such a polyurethane polymer in the discontinuous phase and in the continuous phase of a multicolor paint as taught herein produces a dried film which has good water resistance, high solids content, and good hiding properties. In the dried film, the polyurethane polymer is crosslinked, and the dried film displays a high degree of hardness, mar resistance, chemical resistance and thermal stability.

Presently most preferred starting film-forming, water-dispersed, crosslinkable polyurethane polymer systems achieve crosslinking by on of the following mechanisms:

(a) having polyfunctionality in their molecular chains, (b) being in combination with a water dispersed reactive curative, or (c) having initially blocked isocyanate groups in their molecular chains wherein the blocking agent is released at a predetermined elevated temperature. Also, presently most preferred film-forming, water-dispersed, crosslinkable polyurethane polymers are aliphatic.

Optionally, but preferably, the disperse phase bodies and/or the continuous phase can also contain a water dispersed, film-forming, crosslinkable carboxylated polymer which is not a polyurethane and which is in combination with a crosslinking agent for this polymer that is selected from the class consisting of water disperable multifunctional carbodiimides and water dispersible polyfunctional aziridines.

The presently most preferred such carboxylated polymer is a carboxylated styrene acrylate copolymer, and the presently most preferred crosslinking agent is a multifunctional carbodiimide. Such a combination in a paint of this invention produces a paint which has excellent high mutual water dispersability, film-forming capacity, and dried film water resistance.

The inventive multicolor paints .hcaracteristically display excellent shelf life stability and the capacity to form water resistant coatings when the paint is applied and dried as a surface layer.

Also, the inventive multicolor paints are characterized by having a sufficiently low content of volatile organic components to be acceptable u.ider certain proposed and recently adopted governmental regulations concerning paints and coatings.

So far as now known, neither water-in-water multicolor paints, nor the dried coatings produced therefrom, have previously been developed with such characteristics.

Other and further objects, aims, purposes, features, advantages, embodiments, and the like will be apparent to those skilled in the art from the present specification taken with the appended claims.

BRIEF DESCRIPTION OF THE DRAWING

In the drawing, a flow sheet is shown illustrating blending sequences suitable for use in practicing the present invention.

DETAILED DESCRIPTION (a) Definitions

The term "water dispersed", or "water dispersible", as used herein with reference, for example, to a polyurethane polymer, a carboxylated polymer, a reactive curative, a crosslinking agent or like material, means that the material can form a water solution or a colloidal suspension in water. However, to enhance the water dispersability of such a material, and to increase the amount of the material which is present per unit of liquid volume in a water dispersed form, particularly in the disperse phase of a multicolor paint of this invention, the water is preferably admixed with a limited amount of water miscible organic liquid or cosolvent, such as hereinafter characterized and illustrated, wherein, for example, the polymer or other material, is at least as dispersible as in water.

The term "dispersed" (and its equivalent word forms such as "dispersible", "dispersability" and the like) is intended to be inclusive of both colloidal and macrocolloidal suspensions, solutions, mixtures thereof, and the like. Preferably, such a polymer or other material is characterized by a capacity to disperse in the water-miscible organic solvent (i.e., cosolvent) to an extent which is similar to that of the material dispersability in water alone. When a cosolvent is present, the quantity thereof is preferably less than about 8 weight percent based on the total weight of the aqueous carrier liquid (or solvent or dispersing liquid) that is present in a given starting polymer dispersion or solution particularly in order to comply with the foregoing regulations regarding permissible volatiles.

The term "crosslinkable", as used herein with reference to a water dispersed polyurethane system or a water dispersed carboxylated polymer, means that the polymer, after being applied to a surface from an aqueous coating composition and allowed to form a film or coating, crosslinks (that is, thermosets or cures) and becomes water insoluble through reaction. The crosslinking occurs preferably during the drying which takes place after an aqueous coating composition of the polymer is applied as a coating to a substrate surface and the aqueous carrier of the coating composition is evaporated. Also, the crosslinking preferably occurs at ambient temperatures and pressures, although heat may sometimes be used to accelerate the drying and the crosslinking reaction.

The term "reactive curative" as used herein refers to any reagent or combination of reagents which will react with a crosslinkable polyurethane polymer (including a mixture of crosslinkable polyurethane polymers) to produce a crosslinked polyurethane product when both reagent(s) and the polyurethane polymer are first dispersed together in an aqueous starting dispersion and then are incorporated into a paint composition of this invention which is then coated upon a solid substrate and dried. As indicated herein, a reactive curative can sometimes be (that is, function as) a crosslinking agent for a crosslinkable carboxylated polymer.

The term "crosslinking agent" as used herein refers to an agent which, in dispersed combination with a crosslinkable carboxylated polymer in an aqueous paint composition of this invention, reacts with the polymer to produce a crosslinked carboxylated polymeric product after the paint composition has been coated upon a solid substrate and dried.

The term "storage stability" as used herein with reference to a multicolor paint of this invention means that the paint passes the test procedure of ASTM D-1849-80 which relates to the package stability of paint stored in a 1 quart or 1 liter container at $125°\pm2°$ F. ($52°\pm1°$ C.) for 1 month or 2 months, respectively, as regards consistency and settling.

The term "structural integrity" as used herein in relation to a multicolor paint and the disperse phase bodies therein refers to the ability of the disperse phase bodies therein to remain stable and substantially unchanged when subjected at ambient temperature and pressure to a shear mixing force exerted by a Cowles mixing blade operating at about 450 to about 500 rpm.

As used herein, the term "water resistance" as used herein with reference to a coated and dried film or coating produced from a multicolor paint of this invention refers to the test procedure of ASTM D-1308-79 with regard to both covered and open spot tests.

The term "paint" is used herein in the broad sense of a coloring and coatable substance for spreading as a coating on a surface.

(b) Starting Materials

The term "polyurethane" as used herein refers to a thermoplastic polymer which can be made crosslinkable (or thermosetting) and which is produced by the reaction of a polyisocyanate (that is, an organic compound containing at least two isocyanate ($-N=C=O$) groups per molecule) and a polyol (that is, a glycol compound containing at least two hydroxyl ($-OH$) groups per molecule). The polymeric reaction product contains repeating carbamate ester linkages (or urethane linkages) of the structure:

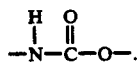

When such linkages are present in a polymer, it is classified as a polyurethane herein.

Polyisocyanates also react with amines (that is, compounds which contain at least one primary or secondary amino

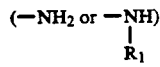

group per molecule (where $R^1$ is typically an alkyl, aryl, or like hydrocarbonaceous radical) in a similar fashion to produce a polymeric reaction product that contains urea linkages:

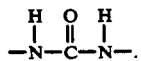

Polymers containing both urethane and urea linkages are known as polyurethane ureas and such polyurethane polymers can be used as starting polymers in the practice of this invention.

Either the starting polyisocyanate or the starting polyol can itself have an internal polymeric structure. Examples of suitable structures include polyethers, polyesters, polyalkyls, polydimethylsiloxanes, and the like. Commonly used isocyanates in polyurethane synthesis include toluene diisocyanate (TDI) and methylene bis (p-phenyl isocyanate) or 4,4'-dimethylmethane diisocyanate (MDI) although many other isocyanates are available. Commonly used polyols include polyesters and polyethers.

A polyurethane polymer can contain various functional (i.e., reactive) groups, such as one or more groups selected from the class consisting of isocyanato, hydroxyl and amino (particularly primary or secondary amino). Such functional groups are characteristically associated with polyurethane polymers. However, in addition to, or apart from, such functional groups, a polyurethane polymer can also contain other functional groups such as carboxyl groups, sulfonic acid groups, and the like, as those skilled in the art will appreciate.

Since the reaction of equimolar quantities of a macroglycol (or a polymeric polyol) and a diisocyanate typically results in a polymer with poor physical properties, it is common to react the diisocyanate with a low molecular weight chain extender to produce a high molecular weight hard sequent which, when then reacted with a macroglycol, results in a two-phase polyurethane microstructure with desirable physical properties. Diols and diamines are used for such chain extension. However, particularly because of dissolution and dispersion forming capacity, diols are presently preferred for use as chain extenders in making the polyurethanes for use as starting materials in the practice of this invention.

The water dispersed, film-forming, crosslinkable polyurethane polymers and the aqueous polyurethane dispersions which are employed as starting materials in the practice of this invention are generally known to the prior art and do not as such constitute a part of the present invention. Aqueous crosslinkable polyurethane dispersions are commercially available from a plurality of sources and are generally suitable for use in the practice of this invention.

Although both aromatic and aliphatic aqueous crosslinkable polyurethane dispersions can be used, the aliphatic type is presently most preferred for use in this invention because this type typically has better color stability and more ultraviolet light (UV) resistance. Aromatic types apparently have a tendency to yellow with age.

Various polymeric backbone types or classes can be used in a given starting polyurethane dispersion that is employed in this invention. Examples include:

A. Polyester type: Exhibits strong adhesion to difficult substrates.

B. Polyether type: Imparts softness, flexibility, hydrolysis resistance and UV resistance to dried coatings.

C. Polycarbonate: Dried coatings display improved resistance to blocking, heat, ambient weather conditions, and resistance to chemicals.

D. Mixtures of different polymeric types which display combinations of properties can be prepared, for example, by using very high molecular weight polymer chains, or by introducing branching or crosslinking into a polymer network.

Typically though not necessarily, a starting aqueous polyurethane dispersion is formulated with an internal stabilization system. Polyurethane dispersions, as those skilled in the art will appreciate, may be classified according to the conventional internal stabilization system used, such as: 1) anionic; 2) cationic; or 3) nonionic. Of these three main systems, anionic polyurethane dispersions are presently most preferred. Nonionic types tend to be susceptible to water because of the inherent hydrophilic nature of the associated polymer and therefore are believed to be least desirable for use in the practice of this invention. Dispersion stabilization systems are known to the polyurethane prior art and are not as such a part of the present invention.

Since the internal stabilization systems used in starting polyurethane dispersions particularly of the types that are commercially available do not adversely affect the method of preparation, the storage stability, the crosslinkability or the usability of product water-in-water multicolor paints or this invention, so far as is now known, it is convenient and now preferred to consider the internal stabilization system as part of the starting water dispersed, fiber-forming, crosslinkable, polyurethane composition for purposes of weight percent calculations and the like in preparing (and using) a product multicolor paint of this invention.

Typical properties associated with starting crosslinkable polyurethane dispersions are illustrated in Table I below:

TABLE 1

| TYPICAL PROPERTIES ASSOCIATED WITH POLYURETHANE DISPERSIONS | | | | | |
|---|---|---|---|---|---|
| | ALIPHATIC POLYCARBONATE | AROMATIC POLYETHER | ALIPHATIC POLYETHER | ALIPHATIC POLYESTER (SOFT) | ALIPHATIC POLYESTER (HARD) |
| I. Dispersions | | | | | |
| Viscosity (cps @ 25° C.) | 100 CPS | 50 CPS | 200 CPS | 100 CPS | 100 CPS |
| pH | 7.5 | 7.5 | 8.0 | 8.0 | 8.0 |
| II. Dried Coatings from Dispersions | | | | | |
| Tensile strength (MPa) | 40 | 10 | 40 | 40 | 45 |
| 100% modulus (MPa) | 20 | 2 | 9 | 2 | 35 |
| Extension at break (%) | 290 | 1,000 | 700 | 1,000 | 250 |
| Konig hardness (secs) | 75 | 15 | 78 | 13 | 90 |
| Approx. N-methylprrolidone content % | 9.5 | -0- | 1 | 2 | 12.5 |
| Solids % | 30 | 35 | 40 | 40 | 30 |

Starting aqueous crosslinkable polyurethane dispersions can be crosslinked in the various ways known to the prior art. The moisture cure mechanism, however, is precluded for use in the aqueous polymer system employed in the present invention. Suitable and presently preferred crosslinking polyurethane systems for use with starting polyurethane dispersions that are suitable for use in the practice of the present invention can be cataloged as follows:

Type 1. One-component-precrosslinked: These polyurethane dispersions are formed by introducing tri- or higher poly-functionality into the component polymeric molecular chains using suitable monomers, such as multifunctional isocyanates, alcohols and/or amines. The resulting polyurethane dispersions tend to require the presence in the liquid carrier of a considerable proportion of an organic cosolvent, such as, for example, N-methyl-2-pyrrolidone, or the like. Crosslinking occurs during drying after coating without other additives being present.

Type 2. Two-component: These polyurethane dispersions are crosslinked by a multifunctional reactive curative which is preferably admixed with a polyurethane dispersion before it is incorporated into a composition of the invention and then is coated on a substrate. Crosslinking then occurs during coating and drying. Thus, crosslinking can be effected with reactive curatives which are water dispersible polyisocyanates. A presently preferred class of such two-component polyurethane dispersions comprises dispersed, anionically stabilized crosslinkable polyurethanes containing incorporated functional carboxyl groups in combination with a reactive curative. The carboxyl groups enhance formation of aqueous dispersions of the polyurethane polymer, and the dispersed carboxylated polyurethane polymer can be crosslinked with a wide range of acidic reactive curatives, including water dispersible polyisocyanates, multifunctional epoxy resins, multifunctional carbodiimides, polyfunctional aziridines, mixtures thereof, and the like.

Type 3. One-component-blocked: These polyurethane dispersions contain blocked isocyanate groups which are chemically bound into the polyurethane polymer chains and which are regenerated (or unblocked) at elevated temperatures such as at a predetermined temperature that can be utilized in a drying operation for a particular coating. The liberated isocyanate groups then undergo the normal crosslinking reactions with urethane or urea groups on the originating or adjacent polymer chains. Such latent or blocked crosslinking sites are formed by reaction of pendant or terminal isocyanate groups with blocking agents, which preferably are relatively low molecular weight compounds capable of forming thermally reversible bonds with isocyanate groups. When a coating containing such a polymer is heated to a certain temperature, the unblocking occurs preferably almost quantitatively, yielding both free isocyanate groups capable of crosslinking the polyurethane. The free blocking agent either remains, or preferably, migrates and evaporates. Heating is thus usually associated with the application and/or drying of polyurethane dispersions of this type. For present purposes, heating temperatures that are effective for initiating crosslinking below about 100° C. are preferred.

Crosslinking systems for aqueous crosslinkable polyurethanes ar known to the polyurethane prior art and are not as such part of the present invention. Since the polyurethane crosslinking systems used in starting polyurethane dispersions particularly of the types that are commercially available do not adversely affect the method of preparation, the storage stability or the usability of product water-in-water multicolor paints of this invention, so far as is now known, it is convenient and now preferred to consider the crosslinking system as part of the starting water dispersed, film-forming, crosslinkable polyurethane composition for purposes of weight percent calculations and the like in preparing (and using) a product multicolor paint of this invention.

For example, a starting water dispersed, film-forming, crosslinkable polyurethane polymer composition used in the practice of this invention can comprise on an estimated 100 weight percent total solids basis about 75 to and including 100 weight percent of starting polyurethane polymer, from and including 0 up to about 25 weight percent of starting reactive curative and from and including up to about 15 weight percent of starting internal stabilization system. For convenience in practicing this invention, such a polymer composition can be considered to be a starting water dispersed, film-forming, crosslinkable polyurethane polymer system.

Also, the amount of water that is present in a given starting aqueous crosslinkable polyurethane dispersion is typically in the range of about 30 to about 65 weight percent and is in the range of about 50 to 58 weight percent (on a 100 weight percent total starting polyurethane dispersion basis) with the amount of cosolvent when present ranging from and including 0 up to about 8 weight percent as indicated above, on the same basis. Starting polyurethane dispersions containing other respective weight percentages of such components can also be employed, if desired. Also, as is typical of commercially available polyurethane dispersions, minor amounts of other components can sometimes be present.

Some examples of suitable commercially available starting aqueous crosslinkable polyurethane dispersions and their properties are shown in Table II below.

tice of this invention are not polyurethanes. Thus, such an added crosslinkable carboxylated polymer is substantially free from urethane linkages and urea linkages and also is substantially free from functional groups selected from the class consisting of hydroxyl, amino and

TABLE II
EXEMPLARY STARTING AQUEOUS CROSSLINKABLE COMMERCIALLY AVAILABLE POLYURETHANE DISPERSIONS

| I.D. | Manufacturer | Polymer Type (Aliphatic or Aromatic) | % Polyurethane Solids in Dispersion | % water | organic solvent % |
|---|---|---|---|---|---|
|  | K. J. QUINN & CO., INC. SEABROOK, NH |  |  |  |  |
|  | Products: |  |  |  |  |
| 1. | QW10 | Aliphatic[1] | 32 |  |  |
| 2. | QW12 | Aliphatic[1] | 35 |  |  |
| 3. | QW14 | Aliphatic[1] | 30 | 58.5 | 11.5 |
| 4. | QW16 | Aliphatic[1] | 40 |  |  |
| 5. | QW18-1[3] | Aliphatic[1] | 35 | 52 | 13.0 |
|  | POLYVINYL CHEMICAL INDUS WILMINGTON, MA |  |  |  |  |
|  | Products: |  |  |  |  |
| 6. | R-960 | Aliphatic | 33 | 48.5 | 18.5 |
| 7. | R-962 | Aliphatic | 34 |  |  |
| 8. | R-963 | Aliphatic | 34 |  |  |
| 9. | R-966 | Aliphatic | 33 |  |  |
| 10. | R-967 | Aliphatic | 40 | 60 | 0 |
|  | WITCO HOUSTON, TX |  |  |  |  |
|  | Products: |  |  |  |  |
| 11. | W-232 | Aliphatic | 30[2] | 56.6 | 13.4 |
| 12. | W-234 | Aliphatic | 30[2] | 57.7 | 12.3 |
| 13. | W-240 | Aliphatic | 30[2] | 56.6 | 13.4 |
| 14. | W-280 | Aliphatic | 62[2] | 38 |  |
| 15. | W-290-H | Aliphatic | 62[2] | 38 | 0 |
| 16. | W-293 | Aliphatic | 67[2] | 33 | 0 |
| 17. | W-3291 | Aliphatic | 60[2] |  |  |
| 18. | W-3294 | Aliphatic | 65[2] |  |  |
|  | SANCOR INDUST. LEOMINSTER, MA |  |  |  |  |
|  | Products: |  |  |  |  |
| 19. | Sancure 815 | Aliphatic | 35 | 56.5 | 8.5 |
| 20. | 822A | Aliphatic | 30 | 55.6 | 13.4 |
| 21. | 847 | Aliphatic | 30 | 62.8 | 7.2 |
| 22. | 849 | Aliphatic | 35 |  |  |
| 23. | 862 | Aliphatic | 35 |  |  |
| 24. | 865 | Aliphatic | 35 |  |  |
| 25. | 867 | Aliphatic | 40 | 60 | 0 |
| 26. | 878 | Aliphatic | 38 | 62 | 0 |
| 27. | 895 | Aliphatic | 35 |  |  |
| 28. | 898 | Aliphatic | 32 | 60.2 | 7.8 |
| 29. | 899 | Aliphatic | 35 | 57.0 | 8.0 |
| 30. | 1818 | Aliphatic | 35 |  |  |
| 31. | 9500 | Aliphatic | 40 |  |  |

Table II footnotes:
[1]Based upon information supplied by the indicated manufacturer, the polyurethane contained in this dispersion is believed to be a polyester.
[2]Based upon information supplied by the indicated manufacturer, this dispersion is believed to contain an anionic internal stabilization system.
[3]Based upon information supplied by the indicated manufacturer, this dispersion is believed to contain a polyurethane polymer which has a molecular weight in the range of about 5700 to about 7000.

While it is presently preferred to make a multicolor paint of this invention using only one or more starting aqueous polyurethane dispersions as the crosslinking polymer, useful multicolor paints of this invention can also be prepared by using such a polyurethane dispersion in combination with a water dispersed, film forming, crosslinkable, carboxylated polymer as described herein and a crosslinking agent.

The water dispersible, film-forming, crosslinkable, carboxylated polymers which are employed as additional optional polymeric starting materials in the practice of this invention are not polyurethanes. Thus, such an added crosslinkable carboxylated polymer is substantially free from urethane linkages and urea linkages and also is substantially free from functional groups selected from the class consisting of hydroxyl, amino and isocyanato. Such carboxylated polymers are generally known in the prior art and do not as such constitute part of the present invention. Some examples of such polymers are shown in Table III below. Typically and preferably, a crosslinkable carboxylated polymer contains at least about 2 weight percent of carboxyl groups on a 100 weight percent total carboxylated polymer weight basis, and more preferably at least about 3 weight percent. Preferably, such a polymer does not contain more than about 7 weight percent of carboxyl groups (same basis).

TABLE III
CROSSLINKABLE, WATER SOLUBLE, FILM FORMING CARBOXYLATED POLYMERS

| ID No. | Chemical Name | Trade Name/Trade Mark | Manufacturer/Source |
|---|---|---|---|
| 1. | Carboxylated Styrene Acrylate Copolymer | "Pliolite" 7103 & 7104 | Goodyear |
| 2. | Carboxy-Modified Acrylic | "Hycar" 26171 | B. F. Goodrich |
| 3. | Carboxy-Modified Acrylic | "Hycar" 26137 | B. F. Goodrich |
| 4. | Carboxy-Modified Acrylic | "Hycar" 26322 | B. F. Goodrich |
| 5. | Carboxy-Modified Acrylic | "Hycar" 26083 | B. F. Goodrich |
| 6. | Carboxy-Modified Acrylic | "Hycar" 26092 | B. F. Goodrich |
| 7. | Carboxy-Modified Acrylic | "Hycar" 2671 | B. F. Goodrich |
| 8. | Carboxy-Modified Acrylic | "Hycar" 26796 | B. F. Goodrich |
| 9. | Carboxy-Modified Acrylic | "Hycar" 26084 | B. F. Goodrich |
| 10. | Carboxy-Modified Acrylic | "Hycar" 26091 | B. F. Goodrich |
| 11. | Carboxy-Modified Acrylic | "Hycar" 26288 | B. F. Goodrich |
| 12. | Carboxy-Modified Acrylic | "Hycar" 26106 | B. F. Goodrich |
| 13. | Carboxy-Modified Acrylic | "Hycar" 26172 | B. F. Goodrich |
| 14. | Carboxy-Modified Vinyl Chloride | "Geon" 460 × 6 | B. F. Goodrich |
| 15. | Carboxy-Modified Vinyl Chloride | "Geon" 460 × 45 | B. F. Goodrich |
| 16. | Carboxy-Modified Vinyl Chloride | "Geon" 460 × 46 | B. F. Goodrich |
| 17. | Carboxy-Modified Vinylidene Copolymer | "Geon" 450 × 61 | B. F. Goodrich |
| 18. | Carboxy-Modified High Acrylonitrile | "Hycar" 1571 | B. F. Goodrich |
| 19. | Carboxy-Modified Special Acrylonitrile | "Hycar" 1570 × 55 | B. F. Goodrich |
| 20. | Carboxy-Modified Special Acrylonitrile | "Hycar" 1572 | B. F. Goodrich |
| 21. | Carboxy-Modified Special Acrylonitrile | "Hycar" 1578 | B. F. Goodrich |
| 22. | Carboxy-Modified Styrene Butadiene | "Goodrite" 257o × 59 | B. F. Goodrich |
| 23. | Carboxy-Modified Vinyl Acetate | "Polyco" 2149c | Borden |
| 24. | Carboxy-Modified Vinyl Acetate | "Polyco" 2142 | Borden |
| 25. | Carboxy-Modified Styrene Butadiene | "Darex" 5101 | W. R. Grace |
| 26. | Carboxy-Modified Styrene Butadiene | "Darex" 5261 | W. R. Grace |
| 27. | Waterborne Aliphatic Urethane | "Sancure" 898 | Sanncor Ind. |
| 28. | Waterborne Aliphatic Urethane | "Q-Thane" QW-18 | K. J. Quinn & Co. |

As indicated above, a carboxylated styrene acrylate copolymer is the most preferred carboxylated polymer type for use in the practice of the present invention. For example, this product is available from Goodyear under the trademark "Pliolite" with the associated product designation numbers 7103 and 7104, and apparently contains about 65 percent by weight styrene and about 35 percent by weight of butyl acrylate and is carboxylated to an extent sufficient to contain about 3 to 4 weight percent carboxyl groups on a 100 weight percent total polymer weight basis.

Such a carboxylated copolymer, for example, can be comprised of about 50 to about 75 weight percent styrene and correspondingly about 25 to about 50 weight percent of at least one (lower alkyl) acrylate monomer on a total polymer weight basis. The acrylate monomer is preferably n-butyl acrylate. Such a polymer is characterized by the feature that, after its formation, it contains pendant carboxylic functional groups which are reactive with a crosslinking agent, such as a multifunctional carbodiimide or a polyfunctional aziridine, to produce a crosslinked, water-insoluble product. The molecular weight of such a starting polymer is low enough to permit the polymer to be water dispersible.

The hydroxy (lower alkyl) cellulose materials employed in the practice of this invention as starting materials are generally known in the prior art. As used herein, the term "lower alkyl" generally refers to an alkyl moiety containing from (and including) one through four carbon atoms. Presently most preferred for use in this invention is a cellulose type additive material such as hydroxyethyl cellulose, a suitable form of such material being available commercially under the trademark "Cellosize" from the Union Carbide Chemicals Company. Such a material is a water-soluble cellulose ether which is believed to be interactive with peptized water swellable clays in aqueous gels, thereby aiding in the formation and maintenance of the disperse phase bodies in a multicolor paint composition of this invention. Hydroxypropyl cellulose is also useful, for example.

The alkali metal carboxy (lower alkyl) cellulose materials employed in the practice of this invention as starting materials are also generally known to the prior art. Presently, a most preferred alkali metal carboxy (lower alkyl) cellulose is sodium carboxy methyl cellulose. One such material is available commercially as "CMC-7-7H3SF" from the Aqualon Company.

The cationic quaternized cellulose materials employed in the practice of this invention as starting materials are also generally known in the prior art. These polymeric materials are available commercially, for example, from Union Carbide Corporation under the trademark "Polymer JR" or "UCARE Polymer" in a variety of viscosity grades. These materials are also known as, and designated by, the CTFA (that is, the Cosmetic, Toiletry and Fragrance Association, Inc.) as "Polyquaternium-10" which is defined as a polymeric quaternary ammonium salt of hydroxyethyl cellulose that has been reacted with a trimethyl ammonium substituted epoxide. Such a water-soluble cellulose ether is theorized to be interactive with at least one other component present in the disperse phase bodies employed in a paint of the present invention; however, the nature of this interreaction is not now known.

The pigment employed in the practice of this invention as a starting material can be selected from among the various pigments known in the prior art. Preferably, the pigment is in the form of dispersible particles having ultimate particle sizes in the submicron range. The pigment should preferably also be substantially insoluble in water or in organic solvents. While a pigment should have a positive colorant value, it can be organic, inorganic, or a mixture of organic and inorganic materials. If desired, as those skilled in the art will appreciate, the pigment can be prepared preliminarily as a slurry, dispersion, or the like in water and/or organic liquid for purposes of simple mechanical blendability. Particulate metals can be used as pigments.

Presently preferred pigments include, for example, titanium dioxide; lamp black; carbon black; bone black; phthalocyanine blue; phthalocyanine green; various organic and inorganic yellow pigments, such as, for example, D & C yellows including quinoline yellow, yellow iron oxide, and the like; various organic and inorganic red pigments, such as, for example, D & C reds including quinacridone red and red iron oxide, respectively, and the like; etc.

The dispersible, water swellable clays employed in the practice of this invention can be selected from among the various known such clays, both natural and synthetic. Preferably, the clay selected is a silicate which has an ultimate particle size in the submicron range. Examples of suitable clays include synthetic silicate clays resembling hectorite and/or saponite, montmorillonite, beidellite, nontronite, sauconite, stevensite, smectite and other inorganic minerals which are characterized by a tendency to swell by absorbing water between adjacent crystal layers, and to split into fragments capable of forming colloidal dispersions. A presently most preferred silicate clay is a synthetic sodium magnesium lithium silicate hectorite-type clay. This material is obtainable commercially from Waverly Mineral Products of Balacynwyd, PA which is a subsidiary of La Porte Inc. of the United Kingdom under the trademark designation "Laponite" RD or RDS. Other suitable hectorite clays are available commercially from the R. T. Vanderfilt Company under the trademark "Veegum T", or from the Baroid Div., National Lead Company under the trademark "Macaloid".

The above described clays are employed in the practice of this invention in combination with a water soluble peptizing agent. Such an agent induces the clay to form a stable colloidal aqueous dispersion. Use of such an agent is conventional with such clays. Examples of known water soluble peptizing agents include ammonium hydroxide, hydrogen peroxide, sodium carbonate, sodium citrate, sodium hydroxide, sodium oxalate, sodium silicate, sodium tripolyphosphate, sodium hexametaphosphate, tetrasodium pyrophosphate, and the like. The last named peptizing agent is presently preferred for use in the practice for this invention.

When a Type 2 (two component) polyurethane dispersion is employed, a reactive curative is present, as indicated above, to produce crosslinking. The reactive curative can be and preferably is a water dispersible polyisocyanate. Suitable polyisocyanates are available commercially. Presently, a most preferred polyisocyanate is an aliphatic polyisocyanate that has a molecular weight in the range of about 260 to about 264.

When the polyurethane polymer of a Type 2 dispersion contains carboxyl groups to enhance water dispersability (as is known in the art of polyurethanes), the reactive curative can (in addition to a polyisocyanate) include a wider range of reagents, such as multifunctional epoxy resins, multifunctional carbodiimides, polyfunctional aziridines, mixtures thereof, and the like.

Suitable multifunctional epoxy resins are available commercially. Such a resin can contain an incorporated amine for imparting water solubility or dispersability thereto, a presently needed property. One suitable and presently preferred multifunctional epoxy resin is available commercially as "EPI-REZ WD-510" from the Rhone-Poulenc Company.

The multifunctional carbodiimides and the polyfunctional aziridines can be the same agents as those used to crosslink a crosslinkable carboxylated polymer as described herein.

The multicolor paint compositions of this invention contain, when a crosslinkable carboxylated polymer is present in either the disperse phase or the continuous phase thereof, a crosslinking agent which is effective for crosslinking the carboxylated crosslinkable polymers involved. Preferably, the crosslinking agent is present in the same phase as that in which the crosslinkable carboxylated polymer is present. Suitable water dispersible crosslinking agents for use in this invention which can interreact with such carboxylated polymers at ambient temperatures and pressures are preferably polyfunctional aziridines and multifunctional carbodiimides (the latter class being presently preferred). Such materials are known in the prior art and are available commercially.

Carbodiimides (sometimes also called cyanamides) are a well-known class of organic compounds having the general structure:

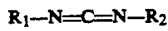

$$R_1-N=C=N-R_2$$

where $R_1$ and $R_2$ are each an organic moiety. Carbodiimides crosslink with carboxylic acid groups to form N-acyl ureas.

A presently preferred carbodiimide is available commercially from Union Carbide under the trademark "UCARLNK XL-25 SE" which is designated as "multifunctional" and is designed for use as a low-temperature crosslinking agent for polymers such as carboxylated polymers.

Aziridines are organic compounds based on the ring structure:

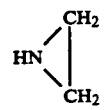

A presently preferred crosslinking polyfunctional aziridine is "ZAMA-7" which is designated "polyfunctional" and is available commercially from Hoechst Celanese and also from Virginia Chemicals. This material also is designed for use as a low-temperature crosslinking agent for polymers such as carboxylated polymers.

As indicated above, the disperse phase bodies and the pigmented, unpigmented or colored continuous phase of this invention preferably each incorporate a water-miscible organic liquid as a cosolvent in combination with the water employed therein. Any convenient water miscible organic liquid can be used, but presently preferred liquids include ester alcohols, such as a material available commercially from Eastman Kodak Company under the trademark "Texanol"; glycol ethers, such as diethylene glycol butyl ether, which is available from Union Carbide Corporation under the trademark "Butyl Carbitol"; and ethylene glycol butyl ether, which is available from Union Carbide Corporation under the trademark "Butyl Cellosolve"; heterocyclics, such as N-methyl-2-pyrrolidone; and the like. N-Pyrrolidine which is available from GAF can also be used.

As can be seen from the preceding description, in a multicolor water-in-water paint of this invention, the water dispersed polyurethane polymer system is preferably a Type 1, Type 2 or Type 3 with regard to its crosslinkability. Thus, in the case of a Type 1 polymer system, the water dispersed polyurethane polymer system comprises on a 100 weight percent total crosslinkable polymer solids basis a water dispersed polyurethane polymer and this polymer is:

(a) comprised of polymer molecules produced by polymerizing mainly monomers which are characterized by containing at least three functional groups per monomer, and wherein said functional groups are selected from the group consisting of isocyanato, hydroxyl, primary amino and secondary amino, and (b) self-crosslinkable when dried from an aqueous dispersion at ambient temperatures.

In the case of a Type 2 polymer system, the water dispersed polyurethane polymer system:

(a) comprises on a 100 weight percent total crosslinkable polymer solids basis, a mixture of at least about 75 weight percent of a water dispersed reactable polyurethane polymer with the balance up to 100 weight percent thereof being a water dispersed reactive curative which is reactive with such polymer, and (b) is crosslinkable when dried from an aqueous dispersion at room temperature.

In one Type 2 preference, the reactive curative comprises a water-dispersible polyisocyanate.

In another Type 2 preference, the reactable polyurethane polymer has unreacted functional groups and at least some thereof are carboxyl groups and the remainder thereof are selected from the group consisting of isocyanato, hydroxyl, primary amino and secondary amino. Here, the water dispersible reactive curative is preferably selected from the group consisting of water dispersible polyisocyanates, water dispersible multifunctional epoxy resins, water dispersible multifunctional carbodiimides and water dispersible polyfunctional aziridines.

In the case of a Type 3 polymer system, the water dispersed polyurethane polymer system comprises on a 100 weight percent total crosslinkable polymer solids basis a water dispersed polyurethane polymer and the polymer is:

(a) characterized by containing a plurality of terminal isocyanato groups per molecule which are each blocked by an associated blocking agent, and the blocking agent is thermally released from substantially all its associated respective isocyanato groups at a temperature in the range of about 50° to about 150° C., and (b) crosslinkable when dried from an aqueous dispersion, and the blocking agent is thermally released at that temperature.

In a multicolor paint of this invention, the polyurethane polymer system is preferably maintained in a water dispersed state by means of an internal stabilization system that is anionic, as indicated above, and that is also incorporated into a starting water dispersed polyurethane polymer system.

(c) Preparation of Blending Compositions

In preparing a multicolor paint composition of this invention, it is convenient and presently preferred to prepare four compositions initially, which are designated respectively as "Composition A", "Composition B", "Composition C" and "Composition D", each of which is described below.

Composition A

Composition A is conveniently prepared by preliminarily dissolving the hydroxy (lower alkyl) cellulose (presently preferred) and/or the alkali metal carboxy (lower alkyl) cellulose in a starting water dispersed, film-forming, crosslinkable polyurethane polymer system. The carrier liquid is preferably a water/cosolvent mixture. Thereafter, the pigment when used is conveniently dispersed in the resulting mixed dispersion.

When a non-polyurethane carboxylated polymer (as described above) is additionally but optionally present in a Composition A, the amount ranges from and including 0 to about 40 weight percent (based on 100 weight percent total of a Composition A). The amount of crosslinking added when this carboxylated polymer is used is at least sufficient to crosslink this polymer when the polymer and the crosslinking agent are dried from an aqueous dispersion at room temperature.

Typically, but preferably, Composition A also includes various optional additives of the type and in the respective amounts conventionally used in paint formulations, such as plasticizers, bonding agents, anti-foaming agents, wetting agents, fungicides, neutralizers, and/or the like. It can be regarded as a feature of the present invention that such additives can be used effectively in a multicolor paint of this invention and can achieve their respective known effects without adversely affecting such desirable paint properties as formulatability, storage stability, applied dried coating water resistance, disperse phase body structural integrity, or the like.

Examples of suitable plasticizers preferably include monomeric plasticizers, such as phthalates like dibutyl phthalate, diisodecyl phthalate, dioctyl phthalate, tricresyl phosphate, butyl benzyl phthalate, and the like. Other suitable monomeric plasticizers ca be selected from among the adipates, sebacates, glycolates, castor oils, and the like.

Examples of suitable bonding agents include epoxidized siloxanes, such as a glycidyl silane like glycidoxy trimethoxy silane, and the like.

Examples of suitable anti-foaming agents include the materials available commercially from Henkel under the trademarks "Foamaster VL", "Dehydran 1293", "Nopco NXZ", and the like.

Examples of suitable wetting agents include polycarboxylic acid salts such as are available from Rohm and Haas under the trademark "Tamol" 165 and also the materials that are available commercially from Rohm and Haas under the trademark "Triton", especially the products CF10 and X100.

The preferred compositional characteristics of a Composition A are shown in Table IV. When, as in Table IV, a composition can contain both a reactive curative (which is in a polyurethane polymer system for purposes of crosslinking) and a crosslinking agent, it will be understood that the amount of crosslinking agent specified is for purposes of causing a carboxylated polymer (not a polyurethane) that is present to crosslink.

TABLE IV

| | COMPOSITION A | | |
|---|---|---|---|
| | | Weight Percent 100% Basis | |
| Ident. No. | Component | Broad (about) | Preferred (about) |
| 1 | Polyurethane polymer system | 10–40% | 14–16% |
| 2 | Carboxylated polymer | 0–40% | 14–35% |
| 3 | Hydroxy (alkyl) cellulose and/or alk. metal carboxyl (alkyl cellulose) | 0.5–2% | 0.75–1.25% |
| 4 | Crosslinking agent | 0–10% | 2.5–3.0% |

TABLE IV-continued
COMPOSITION A

| Ident. No. | Component | Weight Percent 100% Basis | |
|---|---|---|---|
| | | Broad (about) | Preferred (about) |
| 5 | Water | 20–80% | 44–65% |
| 6 | Organic cosolvent | 0–10% | 4.0–8.0% |
| 7 | Pigment | 0–30% | 5–20% |
| 8 | Monomeric plasticizer | 0–3% | 1–2% |
| 9 | Bonding agent | 0–0.50% | 0.10–0.30% |
| 10 | Anti-foaming agent | 0–0.50% | 0.10–0.30% |
| 11 | Wetting agent | 0–1.00% | 0.25–0.75% |
| | (Total) | (100.00) | (100.00) |

Characteristically, Composition A preferably has a viscosity that is believed to be in the range of about 10,000 cps to about 30,000 cps (centipoises) measured with a Brookfield viscometer at 25° C. operating at 20 rpm spindle speed with a No. 4 spindle.

Preferably, the water employed in the practice of this invention is filtered and is either deionized or distilled. A present preference is to employ a water and organic water-miscible cosolvent medium comprised of about 85 to about 90 weight percent water with the balance up to 100 weight percent on a total solvent composition weight basis thereof being the cosolvent (as above characterized).

Composition B

Composition B is prepared by dissolving the quaternized cellulose ether in water. The preferred compositional characteristics of Composition B are identified in Table V below:

TABLE V
COMPOSITION B

| Ident. No. | Component | Weight Percent 100% Basis | |
|---|---|---|---|
| | | Broad (about) | Preferred (about) |
| 1 | Water | 55–99.5 | 98% |
| 2 | Quaternized cellulose ether | 0.5–5 | 2% |
| | (Total) | (100.00) | (100.00) |

Characteristically, Composition B preferably has a viscosity that is believed to be in the range of about 50,000 to about 55,000 centipoises measured at 25° C. with a Brookfield viscometer using a No. 4 spindle operating at a spindle speed of 20 rpm.

Composition C

Composition C is prepared by dissolving a peptizing agent in water and then dispersing a water swellable clay in the resulting solution. In general, the respective amount employed of each material is such that the resulting aqueous system forms a gel. As indicated above, the presently most preferred clay is a synthetic sodium magnesium lithium hectorite clay, and the presently most preferred peptizing agent is tetrasodium pyrophosphate. Composition C is preferably characterized as shown in Table VI:

TABLE VI
COMPOSITION C

| Ident. No. | Component | Weight Percent 100% Basis | |
|---|---|---|---|
| | | Broad (about) | Preferred (about) |
| 1 | Water | 88–95% | 89.4% |
| 2 | Clay | 5–10% | 9.5% |
| 3 | Peptizing Agent | 0.5–2% | 1.1% |
| | (Total) | (100.00) | (100.00) |

Characteristically, Composition C preferably has a viscosity that is believed to be in the range of about 80,000 to about 90,000 cps measured at 25° C. with a Brookfield viscometer operating with a No. 4 spindle at a spindle speed of 20 rpm. Characteristically also, Composition C is a thixotropic gel.

Composition D

Composition D is prepared by dissolving the water dispersible, film-forming, crosslinkable carboxylated polymer and components 5–8 as identified below in a water/cosolvent mixture. Thereafter, a peptizing agent is dissolved in water, a water swellable clay is dispersed in the resulting solution which is added to the water/cosolvent mixture. Composition D is preferably characterized as shown in Table VII:

TABLE VII
COMPOSITION D

| ID | Component | Weight Percent 100% Basis | |
|---|---|---|---|
| | | Broad Range | Presently Most Preferred |
| 1 | Water | 35.00–65.00% | 62.20% |
| 2 | Clay | 2.00–5.00% | 3.00% |
| 3 | Peptizing agent | 0.1–0.75% | 0.15% |
| 4 | Polyurethane polymer system | 2.0–30.00% | 15.00% |
| 5 | Carboxylated polymer | 0–30 | 15.00% |
| 6 | Crosslinking agent | 0–3.0% | 0.65% |
| 7 | Anti-foaming agent | 0–0.20% | 0.15% |
| 8 | Wetting agent | 0–0.20% | 0.15% |
| 9 | Silica | 0–5.00% | 2.50% |
| 10 | Organofunctional silane | 0–0.25% | 0.20% |
| 11 | Organic cosolvent | 0–3.00% | 1.00% |
| | (Total) | (100.00) | (100.00) |

Characteristically, Composition D preferably has a viscosity that is believed to be in the range of about 500 to about 5,000 centipoises measured at 25° C. with a Brookfield viscometer using a No. 4 spindle at a spindle speed of 20 rpm.

(d) Preferred Blending Procedures

Compositions A, B and C are usable in various combinations to prepare disperse phase compositions which are then broken up under mixing shear force to form disperse phase bodies in a continuous phase comprised of Composition D.

Referring to the flow sheet in the appended drawing, which is submitted to be self-explanatory, it is seen that a Composition A is blended with either Composition B or Composition C, and preferably with both Compositions B and C, to prepare a disperse phase composition which is homogeneous. The preferred weight ratios of Composition A to such Compositions B and/or C, as the case may be, and also the preferred viscosities of the resulting disperse phase blend homogeneous compositions, are as shown in Table VIII below:

TABLE VIII

DISPERSE PHASE COMPOSITIONS

| I.D. No. | Disperse Phase Composition of | Preferred Approx. Weight Ratio of Composition A to Other Compositions(s) (B or B + C) | Preferred Approx. Viscosity Range (CPS) of Blended Disperse Phase Composition[(1)] |
|---|---|---|---|
| 1 | A + B | 85:15 to 80:20 | 25,000–27,500 |
| 2 | A + C | 85:15 to 80:20 | 30,000–33,000 |
| 3 | A + B + C | 70:15:15 to 80:10:10 | at least 35,000[(2)] |

Table VIII footnotes
[(1)] All viscosities are measured in centipoises at 25° C. with a Brookfield viscometer using a No. 4 spindle operating at 20 rpm.
[(2)] More preferably, this viscosity is not greater than about 85,000 centipoises (so measured).

The disperse phase compositions are conveniently prepared using simple mechanical blending procedures an conventional mixing apparatus with the amount of mixing shear force used being at least sufficient to produce a uniform and homogeneous product blend. As shown in Table VIII, the viscosity of a resulting disperse phase composition appears to be characteristically greater than that of the Composition A that is incorporated therein.

As indicated, preferred disperse phase compositions incorporate all three of Compositions A, B and C. While such an (A+B+C) composition can be prepared by any convenient procedure, such as by first blending together Compositions A and B or Compositions A and C, and then further combining with the resulting blend a third Composition (either Composition C or B, as the case may be), it is presently preferred to first mix together Composition A and C in a weight ratio within the range shown in Table VIII and then thereafter to mix Composition B therewith using a weight ratio sufficient to achieve a mixing weight ratio as shown in Table VIII for all three of Compositions A, B and C.

An (A+B+C) composition characteristically appears to have a viscosity that is greater than either an (A+B) composition or an (A+C) composition. It is theorized, and there is no intent herein to be bound by theory, that the reason for this increase is that the quaternized cellulose ether has reacted in some now unknown manner with at least one component present in the (A+B+C) composition, perhaps with the polyurethane polymer, and, if present, the carboxylated crosslinkable polymer. An (A+B+C) composition, particularly one prepared by the foregoing preferred procedure, appears to have better tack and elasticity characteristics than other such disperse phase compositions.

The (A+B), (A+C) and (A+B+C) disperse phase compositions of the present invention all appear to be novel over all known prior art teachings pertaining to multicolor aqueous disperse phase compositions, and to have higher viscosities than any previously known aqueous pigmentable composition of the type usable for the disperse phase in multicolor paints.

The (A+B), (A+C) and (A+B+C) disperse phase compositions are used to make multicolor paints of the invention by the following procedure:

First, at least two different (A+B), (A+C) or (A+B+C) compositions are each prepared, each preferably being made by the preferred procedure described above. Each (A+B), (A+C) and (A+B+C) composition of the plurality is prepared using a differently colored pigment; thus, each composition has a different apparent color. Preferably, all of the compositions used in any given multicolor paint are of the same type, that is, (A+B), (A+C) and (A+B+C).

Next, the plurality of the different (A+B), (A+C) or (A+B+C) compositions are blended together with a preformed continuous phase composition which is comprised of a clear or pigmented vehicle as in Composition D. In general, Composition D used as a continuous phase in a multicolor paint of this invention should have at the time of blending with (A+B), (A+C) or (A+B+C) compositions a viscosity that is preferably in the range of about 3,000 to about 7,000 cps as measured at 25° C. with a Brookfield viscometer operating at 20 rpm and using a No. 4 spindle. Such viscosity is more preferably in the range of about 5,000 to about 6,000 cps.

In general, the viscosity of the continuous phase is less than the viscosity of the gel phase composition. Preferably, the ratio of the viscosity of the continuous phase composition to the viscosity of each of the disperse phase compositions (comparably measured) is in the range of about 1:5 to about 1:10 with a viscosity ratio range of about 1:7 to about 1:8.5 being presently more preferred.

The respective amounts of the individual (A+B), (A+C) and (A+B+C) compositions employed in a given multicolor paint can be varied according to the artistic preference of the formulator. Preferably, the weight ratio of the total weight of all (A+B), (A+C) and/or (A+B+C) compositions employed in a given multicolor paint of this invention to the weight of Composition D employed in such paint is in the range of about 1:1 to about 6:4, although larger and smaller weight ratios can be used, if desired.

In a product multicolor paint of this invention, such viscosity differences between the discontinuous phase compositions and the continuous phase compositions, and such a total weight ratio of weight of total discontinuous phase compositions to weight of continuous phase composition are now believed to be desirable because such appear to result in production of a product paint wherein the disperse phase bodies form and remain suspended and discrete during subsequent paint storage.

Disperse phase (A+B), (A+C) and (A+B+C) compositions can be blended with a continuous phase composition in any order or manner. During blending, the disperse phase compositions break up and disperse to form discontinuous phase bodies in the continuous phase. The mixing shear force used in the blending is inversely proportional to the average size of the disperse phase bodies formed. The resulting dispersion constitutes a multicolor paint according to this invention.

The discontinuous phase bodies are characterized by what is believed to be unusual and surprisingly greater structural integrity compared to the structural integrity of prior art discontinuous phase bodies, such as the bodies taught, for example, in the above-referenced Sellars et al. U.S. Pat. No. 3,950,283.

A continuous phase which includes a crosslinkable Composition D exhibits superior film properties compared to continuous phases of the prior art.

Various mixing procedures can be employed. When, for example, a multicolor paint of this invention is prepared wherein the discontinuous phase color bodies are to have different sizes relative to one another, one can prepare the different sized discontinuous phase bodies in separate mixing operations with different Composition D batches using different mixing shear forces. Thereafter, the different and separately prepared continuous/discontinuous phase dispersion compositions can be blended together. Preferably, a mixing shear force is used in such a blending which is not larger than that used to make the largest size disperse phase bodies desired in the resulting mixed dispersions.

Study of the (A+B), (A+C) and (A+B+C) compositions indicates that each is a gel and remains a gel when formed into disperse phase bodies in a multicolor paint composition of the invention. The gel bodies formed from (A+B+C) compositions are believed to have the greatest internal structural integrity or strength.

Once the (A+B), (A+C) and (A+B+C) compositions are broken up by mixing in a Composition D, the resulting disperse phase bodies apparently cannot and do not separate to reform the respective original (A+B), (A+C) and/or (A+B+C) compositions. Apparently, the disperse phase particles or bodies each have a crosslinked surface and internal structure, and also an interfacial bonding relationship between the continuous phase and the discontinuous phase bodies. No discrete interfacial material layer, such as a shell wall or the like, is believed to exist between the disperse phase bodies and the continuous phase.

Typically, the disperse phase body particle sizes in a multicolor paint of this invention have a size in the range of about 0.2 to about 15 mm, but larger and smaller body or particle sizes can be employed, if desired.

The multicolor paint compositions of this invention are characteristically indefinitely storage stable, including shelf, shipping, thermal, and vibrational (mixing) aspects.

The excellent strength and stability characteristics of a multicolored paint composition of this invention provide a composition which can be brushed, rolled or sprayed using the relatively high shear forces that are characteristically exerted upon a paint formulation being so applied without disperse phase color body breakdown.

While a multicolor paint formulation of this invention characteristically contains at least two distinct colors, those skilled in the art will appreciate that a particular multicolor paint formulation may contain many different classes of distinctly separately colored or non-colored disperse phase bodies, perhaps six or more, each individual identically colored group of discrete disperse phase bodies having been separately preliminarily prepared as an (A+B), (A+C) or (A+B+C) disperse phase composition as hereinabove described, before the disperse phase composition is blended into the continuous phase. Various ratios and proportions of respective (A+B), (A+C) and (A+B+C) compositions relative to one another can be used as desired in blending, as indicated above.

An optional but preferred component of a multicolor paint of this invention is a neutralizer base which is used for reasons of pH control and buffering. Examples of suitable neutralizers include aqueous potassium hydroxide, ammonium hydroxide, triethanolamine, dimethylethanol amine, mixtures thereof, and the like. When employed, the amount of neutralizer used can range from greater than zero up to about 0.6 weight percent on a 100 weight percent total paint composition basis. The neutralizer, when used, can be added at any convenient point during the blending sequence; for example, the neutralizer can be added to Composition A or to the final mixture of gel phase composition and continuous phase at the time when such are being blended together. It is presently preferred to have a product paint composition wherein the continuous phase has a pH in the range of about 8 to about 9 and similarly for the discontinuous (or disperse) phase. The neutralizer can be preliminarily prepared as an aqueous solution or dispersion for ease in blending.

In a product multicolor paint of this invention, at least one of either the total discontinuous phase or the continuous phase thereof can optionally contain from and including 0 to about 25 weight percent on a 100 weight percent total phase basis of water dispersed carboxylated polymer (as described above) plus sufficient water dispersed crosslinking agent (as described above) to crosslink this carboxylated polymer when the carboxylated polymer and the crosslinking agent are dried from an aqueous dispersion at room temperature. Usually the total amount of this crosslinking polymer in both phases of a product multicolor paint is not more than about 3 weight percent on a total 100 weight percent product paint basis.

The compositional characteristics for a preferred class of multicolor paint compositions of this invention are summarized in Table IX below:

TABLE IX

| MULTICOLORED PAINT COMPOSITIONS | | |
|---|---|---|
| | Presently Most Preferred | Preferred Range (About) |
| Water soluble, film-forming crosslinkable polyurethane polymer system | 22.75% | 2–33% |
| Water soluble, film-forming crosslinkable carboxylated polymer | 15.75% | 0–42% |
| Hydroxy (alkyl) cellulose | 0.35% | 0.5–1.25% |
| Pigment | 8.00% | 2–20% |
| Carboxyl polymer crosslinking agent | 1.00% | 0–3% |
| Quaternized cellulose ether | 0.15% | 0.05–2% |
| Silica | 1.20% | 0.5–3% |
| Clay | 3.00% | 0.1–10% |
| Peptizing agent | 0.35% | 0.1–1.0% |
| Organic cosolvent | 7.25% | 1.5–7.5% |
| Water | 39.5% | 20–80% |
| Wetting agent | 0.25% | 0.10–0.50% |
| Anti-foaming agent | 0.15% | 0.05–0.50% |
| Bonding agent | 0.10% | 0.05–0.25% |
| Neutralizer | 0.20% | 0.05–0.50% |
| (Total Weight Percent) | (100.00) | (100.00) |

It will be appreciated that a multicolor paint of the present invention can generally be applied by any conventional application method desired utilizing spraying, brushing, roller, pad, or the like.

As the applied paint coating dries on a surface, the film-forming polyurethane polymer in combination with the other components present form a continuous film or coating in which the disperse phase bodies become located typically in adjacent relationship to one another. Both the water and the organic cosolvent (if present) evaporate. The resulting coating becomes substantially fully crosslinked.

As the applied paint coating dries on a surface, the film-forming carboxylated polymer in combination with the same polymers present form a continuous film or coating in which the disperse phase bodies become located typically in adjacent relationship to one another.

A product dried coating displays excellent properties, especially water resistance, as well as abrasion (wear) resistance, thermal stability, washability, surface smoothness, and the like.

The invention is further illustrated by the following Examples.

EXAMPLES 1 and 2: PREPARATION OF FIRST AND SECOND "Composition "A"

Two embodiments of "Composition A" are prepared by blending together the following components in the respective amounts indicated using a Cowles blade operating at about 450 to about 1500 rpm in a mixer:

| FIRST & SECOND "COMPOSITION A" | | |
|---|---|---|
| Component | Ex. 1 (wt %) | Ex. 2 (wt %) |
| Dispersed Polyurethane Polymer (QW-18-1) | 58.17 | 58.17 |
| Water | 27.38 | 27.38 |
| Wetting agent (TAMOL 165) | 0.50 | 0.50 |
| Anti-foaming agent (NOPCO NXZ) | 0.50 | 0.50 |
| Hydroxyethyl cellulose (Cellosize QP-100-MH) | 1.00 | 1.00 |
| Titanium dioxide (Dupont R-900) | 10.00 | — |
| Bone black (Ebonex 3D) | — | 8.20 |
| Barium sulfate (Barytes) | — | 1.80 |
| Organo functional silane (A-187) | 0.20 | 0.20 |
| Carbodiimide (UCARLNK XL-25-SE) | 2.00 | 2.00 |
| Ammonium hydroxide (28% Ammonia) | 0.25 | 0.25 |
| (Total Weight Percent) | (100.00) | (100.00) |

The "Composition A" of Example 1 is white in color and its Brookfield viscosity is believed to be in the range of about 10,000 to about 25,000 cps measured at 25° C. using a No. 4 spindle operating at 20 rpm, and the "Composition A" of Example 2 is black in color and its Brookfield viscosity is believed to be in the range of about 10,000 to about 30,000 cps similarly measured.

EXAMPLE 3: PREPARATION OF CLEAR "COMPOSITION A"

A clear "Composition A" is prepared by blending together the following components in the respective amounts indicated using a Cowles blade operating at about 450 to about 1,500 rpm in a mixer.

| CLEAR "COMPOSITION A" | |
|---|---|
| Component | Ex. 3 |
| Dispersed Polyurethane Polymer (QW-18-1) | 63.27 |
| Water | 29.78 |
| Wetting agent (TAMOL 165) | 0.50 |
| Anti-foaming agent (NOPCO NXZ) | 0.50 |
| Hydroxyethyl cellulose (Cellosize QP-100-MH) | 1.00 |
| Silica (OK 412) | 2.50 |
| Organo functional silane (A-187) | 0.20 |
| Carbodiimide (UCARLNK XL-25-SE) | 2.00 |
| Ammonium hydroxide (28% Ammonia) | 0.25 |
| (Total Weight Percent) | (100.00) |

The "Composition A" of Example 3 is clear and its Brookfield viscosity is believed to be in the range of about 10,000 to about 20,000 cps measured at 25° C. using a No. 4 spindle operating at 20 rpm.

EXAMPLE 4: PREPARATION OF "COMPOSITION B"

A "Composition B" is prepared by blending together the following components in the respective amounts indicated using a Cowles blade operating at about 1,000 to about 2,500 rpm in a mixer:

| COMPOSITION B | |
|---|---|
| Water | 98.00 |
| Quaternized cellulose ether Polyquaternium-10 (UCARE Polymer JR-30) | 2.00 |
| (Total Weight Percent) | (100.00) |

The Brookfield viscosity of the resulting "Composition B" is about 50,000 cps measured at 25° C. using a No. 4 spindle operating at 20 rpm.

EXAMPLE 5: PREPARATION OF "COMPOSITION C"

A "Composition C" is prepared by blending together the following components in the respective amounts indicated using a Cowles blade operating at about 750 to about 2,000 rpm in a mixer:

| COMPOSITION C | |
|---|---|
| Water | 89.40 |
| Synthetic sodium magnesium lithium hectorite clay (Laponite RDS) | 9.50 |
| Peptizing agent (tetrasodium pyrophosphate | 1.10 |
| (total Weight Percent) | (100.00) |

The Brookfield viscosity of the resulting "Composition C" is about 85,000 cps measured at 25° C. using a No. 4 spindle operating at 20 rpm.

EXAMPLE 6: PREPARATION OF "COMPOSITION D"

A "Composition D" which is clear, pigmented, metallic or which includes a transparent dye, as desired, is prepared by blending together the following components in the respective amounts indicated using a Cowles blade operating at about 750 to about 1,500 rpm in a mixer.

The same water dispersible, film-forming, crosslinkable polyurethane polymer employed in the discontinuous phase is preferably used in preparing "Composition D". The addition of such a polymer in a "Composition D" of a multicolor paint produces a more impregnable film with a higher solids content and better hiding properties relative to a paint which includes a "Composition D" formed with a similar, but non-carboxylated, polymer.

The use of the foregoing polymer in a "Composition D" of a multicolor paint also provides a more homogeneous paint film which improves the drying speed, the sheen control, washability, durability and water resistance of the final coating. When the foregoing polymer is crosslinked, a high degree of hardness, mar resistance, chemical resistance and thermal stability is provided. The resulting multicolor paint can be applied as a surface coating with a paint roller or brush and can be sprayed with spray equipment.

| COMPOSITION D | | | | |
|---|---|---|---|---|
| | Clear Ex. 6a | Pigmented Ex. 6b | Metallic Ex. 6c | Transparent Dye Ex. 6d |
| Polyurethane Polymer | 47.07 | 37.07 | 43.57 | 46.07 |
| Water | 44.70 | 44.70 | 44.70 | 44.70 |

-continued

COMPOSITION D

| | Clear Ex. 6a | Pigmented Ex. 6b | Metallic Ex. 6c | Transparent Dye Ex. 6d |
|---|---|---|---|---|
| Clay | 4.75 | 4.75 | 4.75 | 4.75 |
| Peptizing agent | 0.55 | 0.55 | 0.55 | 0.55 |
| Anti-foaming agent (NOPCO NXZ) | 0.15 | 0.15 | 0.15 | 0.15 |
| Wetting agent (TAMOL 165) | 0.15 | 0.15 | 0.15 | 0.15 |
| Silica (OK412) | 2.50 | 2.50 | 2.50 | 2.50 |
| Organo functional silane (A-187) | 0.13 | 0.13 | 0.13 | 0.13 |
| Titanium dioxide (Dupont R-900) | — | 10.00 | — | — |
| Water miscible aluminum paste (StaphydroLac W-60-NL) | — | — | 2.50 | — |
| Organic cosolvent (Butyl Cellosolve) | — | — | 1.00 | — |
| Water miscible dye (NEROSOL Yellow R) | — | — | — | 1.00 |
| (Total Weight Percent) | (100.00) | (100.00) | (100.00) | (100.00) |

The Brookfield viscosity of the resulting "Composition D" is about 1,000 to 1,500 cps measured at 25° C. using a No. 4 spindle operating at 20 rpm.

EXAMPLE 7: PREPARATION OF FIRST DISPERSE PHASE GEL COMPOSITION

A first disperse phase gel composition is prepared by blending together the following indicated amounts of each of Examples 1 and 4 using a Cowles blade operating at about 800 to 1,500 rpm in a mixer:

| "Composition A" Example 1 (white) | 82.40 |
|---|---|
| "Composition B" Example 4 | 17.60 |
| (Total Weight Percent) | (100.00) |

The Brookfield viscosity of the resulting gel composition is about 26,000 cps measured at 25° C. using a No. 4 spindle operating at 20 rpm.

EXAMPLE 8: PREPARATION OF FIRST DISPERSE PHASE GEL COMPOSITION

A first disperse phase gel composition is prepared by blending together the following indicated amounts of each of Examples 1 and 5 using a Cowles blade operating at about 1,000 to about 2,000 rpm in a mixer:

| "Composition A" Example 1 (white) | 82.40 |
|---|---|
| "Composition C" Example 5 | 17.60 |
| (Total Weight Percent) | (100.00) |

The Brookfield viscosity of the resulting gel composition is about 31,000 cps measured at 25° C. using a No. 4 spindle operating at 20 rpm.

EXAMPLE 9: PREPARATION OF FIRST DISPERSE PHASE GEL COMPOSITION

A first disperse phase gel composition is prepared by blending together the following indicated amounts of each of Examples 1, 4, and 5 using a Cowles blade operating at about 1,000 to about 2,500 rpm in a mixer:

| "Composition A" Example 1 (white) | 70.00 |
|---|---|
| "Composition B" Example 4 | 15.00 |
| "Composition C" Example 5 | 15.00 |
| (Total Weight Percent) | (100.00) |

The Brookfield viscosity of the resulting gel composition is about 35,000 cps measured at 25° C. using a No. 4 spindle operating at 20 rpm.

EXAMPLE 10: PREPARATION OF SECOND DISPERSE PHASE GEL COMPOSITION

A second disperse phase gel composition is prepared by blending together the following indicated amounts of each of Examples 2 and 4 using a Cowles blade operating at about 800 to 1,500 rpm in a mixer:

| "Composition A" Example 2 (black) | 82.40 |
|---|---|
| "Composition B" Example 4 | 17.60 |
| (Total Weight Percent) | (100.00) |

The Brookfield viscosity of the resulting gel composition is about 29,500 cps measured at 25° C. using a No. 4 spindle operating at 20 rpm.

EXAMPLE 11: PREPARATION OF SECOND DISPERSE PHASE GEL COMPOSITION

A second disperse phase gel composition is prepared by blending together the following indicated amounts of each of Examples 2 and 5 using a Cowles blade operating at about 1,000 to about 2,000 rpm in a mixer:

| "Composition A" Example 2 (black) | 82.40 |
|---|---|
| "Composition C" Example 5 | 17.60 |
| (Total Weight Percent) | (100.00) |

The Brookfield viscosity of the resulting gel composition is about 32,000 cps measured at 25° C. using a No. 4 spindle operating at 20 rpm.

EXAMPLE 12: PREPARATION OF SECOND DISPERSE PHASE GEL COMPOSITION

A second disperse phase gel composition is prepared by blending together the following indicated amounts of each of Examples 2, 4 and 5 using a Cowles blade operating at about 1,000 to about 2,500 rpm in a mixer:

| "Composition A" Example 2 (black) | 70.00 |
|---|---|
| "Composition B" Example 4 | 15.00 |
| "Composition C" Example 5 | 15.00 |
| (Total Weight Percent) | (100.00) |

The Brookfield viscosity of the resulting gel composition is about 37,500 cps measured at 25° C. using a No. 4 spindle operating at 20 rpm.

EXAMPLE 13: PREPARATION OF THIRD DISPERSE PHASE GEL

A clear third disperse phase gel composition is prepared by blending together the following indicated amounts of each using a Cowles blade operating at about 1,000 to about 2,500 rpm in a mixer:

| | |
|---|---|
| "Composition A" Example 3 | 70.00 |
| "Composition B" Example 4 | 15.00 |
| "Composition C" Example 5 | 15.00 |

The Brookfield viscosity of the resulting clear gel composition is about 35,000 cps measured at 25° C. using a No. 4 spindle operating at 20 rpm.

EXAMPLES 14-17: PREPARATION OF MULTICOLOR PAINT INCLUDING COMPOSITION D AS THE CONTINUOUS PHASE

A multicolor paint is prepared by mixing the quantity of Composition D shown in Table X with the specified previously described and prepared composition:

TABLE X

| | White & Black Ex. 14 | Black Metallic Ex. 15 | Transparent Yellow Metallic Ex.16 | Black & White Ex. 17 |
|---|---|---|---|---|
| Composition D Clear (Ex. 6a) | — | — | — | 46.60 |
| Composition D pigmented (Ex. 6b) | 46.60 | — | — | — |
| Composition D metallic (Ex. 6c) | — | 22.80 | — | — |
| Composition D transparent dye (Ex. 6d) | — | — | 22.80 | — |
| First disperse phase gel (white) Examples 7, 8 and 9 | 46.60 | — | — | 46.60 |
| Second disperse phase gel (black) Examples 10, 11 and 12 | — | — | — | 46.60 |
| Third disperse phase gel (clear) Example 13 | — | 22.80 | 22.80 | — |
| Composition D Clear (Ex. 6a) | 1.20 | 25.00 | — | 1.20 |
| Composition D pigmented (Ex. 6b) | — | — | — | — |
| Composition D metallic (Ex. 6c) | — | — | 25.00 | — |
| Composition D transparent dye (Ex. 6d) | — | — | — | — |
| First disperse phase gel (white) Examples 7, 8 and 9 | — | — | — | — |
| Second disperse phase gel (black) Examples 10, 11 and 12 | 1.20 | 25.00 | — | 1.20 |
| Third disperse phase gel (clear) Example 13 | — | — | 25.00 | — |
| Butyl benzyl phthalate (Santicizer 160) | 1.00 | 1.00 | 1.00 | 1.00 |
| Ester Alcohol (TEXANOL) | 1.00 | 1.00 | 1.00 | 1.00 |
| Ethylene glycol butyl ether (Butyl Cellosolve) | 2.40 | 2.40 | 2.40 | 2.40 |

Throughout the preparation of the multicolor paints of Examples 14-17, a Cowles blade in a mixer operates in the range of about 400 to about 500 rpm. The Brookfield viscosity of the product multicolor paint is in the range of about 5,000 to about 7,000 cps measured at 25° C. using a No. 4 spindle operating at 20 rpm.

The foregoing multicolor paints exhibit the improved properties discussed above with reference to Example 6. The paint can be applied as a surface coating with a paint roller or brush and can be sprayed with spray equipment as described below.

EXAMPLE 18: APPLICATION OF THE MULTICOLOR PAINT

Each of the multicolor paints of the Examples 14-17 is applied using each of:

(1) roller application using a foam roller at 30-60 pps (pores per square inch);

(2) brush application using a foam, synthetic or bristle type brush;

(3) a conventional air spray set up with a pressurized feed tank and dual regulators. Binks Gun Model 2001 with an internal or external mix air nozzle assembly. Air pressures with an internal mix assembly: gun pressure, 30 psi and material air pressure 35 psi. With external mix nozzle assembly, air pressure at the gun is about 20 to 30 psi and air pressure of the material is about 10 to 15 psi;

(4) most airless sprayers. Pump type Graco Model PT2500 with 221-517 tip size and using application pressures of about 200 psi at the gun tip; and (5) H.V.L.P. spray equipment (high volume, low pressure). (Wagner Cap Spray Units CS5000 and CS8000).

It is found that a uniform multicolor coating is produced from each paint. Each coating dries to a tack-free film (or coating) in about 30 minutes in air. Maximum film properties are attainable after an additional post-curing time of 96 hours in air.

Each fully cured coating is found to pass the ASTM No. D-1308-79 water spot test, both opened and covered.

Drying time of a coated paint can be accelerated by forced air drying at 125°-150° F.

EXAMPLES 19 THROUGH 28: OTHER EMBODIMENTS

When each of the water soluble, film-forming, crosslinkable polyurethane polymers shown in Table XI below is substituted for the polyurethane polymer employed in Examples 1 and 2, and then when each of such resulting "Compositions A" are used to prepare multicolor paints as described in the procedures of foregoing Examples, a multicolor paint is produced which, when coated as described in Example 18, is found to pass the water spot tests of ASTM D-1308-79.

TABLE XI

| | Other Embodiments Using Crosslinkable Water Soluble Polymers | | | | | | | | | |
|---|---|---|---|---|---|---|---|---|---|---|
| | Example No. | | | | | | | | | |
| | 19 | 20 | 21 | 22 | 23 | 24 | 25 | 26 | 27 | 28 |
| Water | 37.85 | 37.85 | 42.02 | 50.76 | 42.02 | 41.95 | 37.85 | 45.35 | 42.85 | 42.85 |
| Wetting agent (TAMOL 165) | 0.50 | 0.50 | 0.50 | 0.50 | 0.50 | 0.50 | 0.50 | 0.50 | 0.50 | 0.50 |
| Anti-foaming agent (NOPCO NXZ) | 0.20 | 0.20 | 0.20 | 0.20 | 0.20 | 0.20 | 0.20 | 0.20 | 0.20 | 0.20 |
| Hydroxyethyl cellulose (Cellosize QP-100-MH) | 1.00 | 1.00 | 1.00 | 1.00 | 1.00 | 1.00 | 1.00 | 1.00 | — | — |
| Titanium dioxide (Dupont R-900) | 10.00 | 10.00 | 10.00 | 10.00 | 10.00 | 10.00 | 10.00 | 10.00 | 10.00 | 10.00 |

TABLE XI-continued

Other Embodiments Using Crosslinkable Water Soluble Polymers

| | Example No. | | | | | | | | | |
|---|---|---|---|---|---|---|---|---|---|---|
| | 19 | 20 | 21 | 22 | 23 | 24 | 25 | 26 | 27 | 28 |
| Polyurethane dispersion | | | | | | | | | | |
| Aliphatic QW-10 | 37.50 | | | | | | | | | |
| Aliphatic QW-12 | | 37.50 | | | | | | | | |
| Aliphatic QW-14 | | | 33.33 | | | | | | | |
| Aliphatic QW-16 | | | | 24.59 | | | | | | |
| Aliphatic Sancure 815 | | | | | 33.33 | | | | | |
| Aliphatic Sancure 878 | | | | | | 33.40 | | | | |
| Aliphatic Sancure 849 | | | | | | | 37.50 | | | |
| Aliphatic Sancure 895 | | | | | | | | 30.00 | | |
| Aliphatic Sancure 899 | | | | | | | | | 40.00 | — |
| Waterborne aliphatic urethane "Sancure" 898 | | | | | | | | | | 40.00 |
| Waterborne aliphatic urethane "Q-Thane" QW-18 | | | | | | | | | — | — |
| Butyl benzyl phthalate (Santicizer 160) | 1.50 | 1.50 | 1.50 | 1.50 | 1.50 | 1.50 | 1.50 | 1.50 | — | — |
| Organo functional silane (A-187) | 0.20 | 0.20 | 0.20 | 0.20 | 0.20 | 0.20 | 0.20 | 0.20 | 0.20 | 0.20 |
| Ester alcohol (TEXANOL) | 1.25 | 1.25 | 1.25 | 1.25 | 1.25 | 1.25 | 1.25 | 1.25 | — | — |
| Ethylene glycol butyl ether (Butyl Cellosolve) | 3.50 | 3.50 | 3.50 | 3.50 | 3.50 | 3.50 | 3.50 | 3.50 | — | — |
| Carbodiimide (UCARLNK XL-25-SE) | 6.00 | 6.00 | 6.00 | 6.00 | 6.00 | 6.00 | 6.00 | 6.00 | 6.00 | 6.00 |
| Ammonium hydroxide (28% Ammonia) | 0.50 | 0.50 | 0.50 | 0.50 | 0.50 | 0.50 | 0.50 | 0.50 | 0.25 | 0.25 |
| (Total Weight Percent) | (100.00) | (100.00) | (100.00) | (100.00) | (100.00) | (100.00) | (100.00) | (100.00) | (100.00) | (100.00) |

In the foregoing Examples, the hydroxyethyl cellulose can be replaced with: A) hydroxymethyl cellulose (Dow A type); B) hydroxypropyl cellulose (Aqualon Klucel S-97A type); and C) sodium carboxy methyl cellulose (Aqualon CMC-7-7H3SF). The carbodiimide crosslinker can be replaced by the polyfunctional aziridine crosslinking agent "Zama-7" from Virginia chemicals. The "Composition C" hectorite clay (Laponite RDS) can be replaced by: A) Laponite RD; B) Veegum T; and C) Macaloid. And the "Composition C" peptizing agent (tetrasodium pyrophosphate) can be replaced by: A) sodium pyrophosphate; B) sodium tripolyphosphate; and C) sodium hexametaphosphate.

While the foregoing description makes use of illustrative examples of various types, no limitations upon the present invention are to be implied or inferred therefrom.

What is claimed is:

1. A method for making a water-in-water multicolor paint comprising the steps of:
   (A) providing a first composition comprising on a 100 weight percent basis:
      (a) about 10 to about 40 weight percent of a water dispersed, film-forming, crosslinkable, polyurethane polymer system, said system comprising on a 100 weight percent total crosslinkable solids basis about 75 to and including 100 weight percent of polyurethane polymer and correspondingly from and including 0 to about 25 weight percent of reactive curative,
      (b) about 0.5 to about 2 weight percent dissolved cellulose material selected from the class consisting of hydroxy (lower alkyl) cellulose and alkali metal carboxylated (lower alkyl) cellulose,
      (c) from and including 0 to about 30 weight percent dispersed pigment,
      (d) from and including 0 to about 10 weight percent organic cosolvent, and
      (e) about 20 to about 80 weight percent water;
   (B) providing a second composition comprising on a 100 weight percent basis:
      (a) about 0.5 to about 5 weight percent dissolved cationic quaternized cellulose ether, and
      (b) about 95 to about 99.5 weight percent water;
   (C) providing a third composition comprising on a 100 weight percent basis:
      (a) about 0.5 to about 2 weight percent dissolved peptizing agent,
      (b) about 5 to about 10 weight percent dispersed water swellable clay, and
      (c) about 88 to about 95 weight percent water;
   (D) providing a fourth composition comprising on a 100 weight percent basis:
      (a) about 2 to about 5 weight percent dispersed water swellable clay,
      (b) about 0.1 to about 0.75 weight percent dissolved peptizing agent,
      (c) about 2 to about 30 weight percent of said dispersed, film-forming, crosslinkable, polyurethane polymer system,
      (d) from and including 0 to about 0.2 weight percent anti-foaming agent,
      (e) from and including 0 to about 0.2 weight percent wetting agent,
      (f) from and including 0 to 5 weight percent silica,
      (g) from and including 0 to about 0.25 weight percent organofunctional silane,
      (h) from and including 0 to about 3 weight percent organic cosolvent, and
      (i) about 35 to about 65 weight percent water,
   the relationship between components of said fourth composition being such that said fourth composition has a viscosity in the range of about 1,000 to about 1,500 centipoises;
   (E) blending said first composition with a composition selected from the group consisting of:

(a) said second composition in the weight ratio range of about 85:15 through about 80:20 of said first composition to said second composition, (b) said third composition in the weight ratio range of about 85:15 to about 80:20 of said first composition to said third composition, and (c) a combination of said second composition and said third composition in the weight ratio range of about 70:15:15 to about 80:10:10 of said first composition to said second composition to said third composition so as to produce a first disperse phase gel composition having a viscosity in the range of about 25,000 to about 85,000 centipoises; and (F) mixing said first disperse phase gel composition with said fourth composition so that the ratio of the viscosity of said fourth composition to the viscosity of said first disperse phase composition is in the range of about 1:5 to about 1:10, the mixing shear force used in said mixing being sufficient to break up said first disperse phase gel composition into discrete gel bodies dispersed in said fourth composition said mixing shear force being inversely proportional to the average size of said so formed disperse phase bodies, thereby to produce said multicolor paint.

2. The method of claim 1 wherein said polyurethane polymer system comprises a water dispersed polyurethane polymer which is:

(a) comprised of polymer molecules produced by polymerizing mainly monomers which are characterized by containing at least three functional groups per monomer, and wherein said functional groups are selected from the group consisting of isocyanato, hydroxyl, primary amino and secondary amino, and (b) self-crosslinkable when dried from an aqueous dispersion at ambient temperatures.

3. The method of claim 1 wherein said polyurethane polymer system comprises:

(a) on a 100 weight percent total crosslinkable polymer solids basis a mixture of at least about 75 weight percent of a water dispersed reactable polyurethane polymer with the balance up to 100 weight percent thereof being a water dispersed reactive curative, which is reactive with such polymer, and (b) is crosslinkable when dried from an aqueous dispersion at room temperatures.

4. The method of claim 3 wherein said reactive curative comprises a water dispersed polyisocyanate.

5. The method of claim 3 wherein said reactable polyurethane polymer has unreacted functional groups and at least some of said groups are carboxyl groups, and the remainder of said groups are selected from the group consisting of isocyanato, hydroxyl, primary amino, and secondary amino, and wherein said reactive curative is water dispersed and is selected from the group consisting of polyisocyanates, multifunctional epoxy resins, multifunctional carbodiimides water dispersible polyfunctional aziridines, and mixtures thereof.

6. The method of claim 1 wherein said polyurethane polymer system comprises a water dispersed polyurethane polymer which is:

(a) characterized by containing a plurality of terminal isocyanato groups per molecule which are each blocked by an associated blocking agent, and said blocking agent is thermally released from substantially all its associated respective isocyanato groups at a temperature in the range of about 50° to about 150° C., and (b) crosslinkable when dried from an aqueous dispersion and said blocking agent is so thermally released at said temperature.

7. The method of claim 1 wherein said first composition additionally contains (a) from and including 0 to about 25 weight percent on a 100 weight percent total said first composition basis of a water dispersed carboxylated polymer which is substantially free from urethane linkages and urea linkages and also is substantially free from functional groups selected from the class consisting of hydroxyl, amino, and isocyanato, and (b) at least sufficient water dispersed crosslinking agent selected from the group consisting of multifunctional carbodiimides and polyfunctional aziridines to crosslink said carboxylated polymer when said carboxylated polymer and said crosslinking agent are dried from an aqueous dispersion at room temperature.

8. The method of claim 1 wherein said cellulose material is hydroxy (lower alkyl) cellulose, said water swellable clay is a synthetic sodium magnesium lithium hectorite clay, and said peptizing agent is tetrasodium pyrophosphate.

9. The method of claim 1 wherein said step (E) is repeated a plurality of times, and each one of the resulting so produced plurality of disperse phase gel compositions has a different color relation to others thereof, and each one of said resulting disperse phase gel compositions is so mixed with said fourth composition.

10. The method of claim 9 wherein the weight ratio of the total weight of said disperse phase gel compositions to the weight of said fourth composition is in the range of about 1:1 to about 6:4.

11. The method of claim 9 wherein each of said disperse phase gel compositions has a viscosity which is about 7 to about 8.5 times greater than the viscosity of said fourth composition.

12. The method of claim 1 wherein said step (E) said first composition is so blended with said combination of said second composition and said third composition to produce said first disperse phase gel composition.

13. The method of claim 1 wherein a second disperse phase gel composition is prepared by said steps (A) through (C) and (E), said second disperse phase composition contains a pigment which results in a different coloration for said second disperse phase gel composition relative to said first disperse phase gel composition and said second disperse phase composition is likewise additionally mixed with said fourth composition as prepared by said step (D) and broken up into discrete gel bodies using a mixing procedure as described in said step (F), thereby to produce a multicolor water-in-water paint.

14. The method of claim 13 wherein a plurality of further disperse phase gel compositions are prepared each by said steps (A) through (C) and (E), each of said further disperse phase gel compositions contains a pigment which is different from all others of said disperse phase gel compositions, and each of said further disperse phase compositions is mixed with said fourth composition and broken up into discrete gel bodies using a mixing procedure as described in said step (F), thereby to produce a multicolor water-in-water paint.

15. The method of claim 1 wherein said polyurethane polymer is an aliphatic polymer whose backbone polymer is selected from the groups consisting of polyesters, polyethers, polycarbonates, and mixtures thereof.

16. A water-in-water multicolor paint comprising a discontinuous aqueous phase dispersed in a continuous aqueous phase, said discontinuous aqueous phase being comprised of a plurality of discrete gel bodies, such gel bodies being comprised of a uniform aqueous composition containing in admixture:

water dispersed, film-forming, crosslinkable polyurethane polymer system comprising on a 100 weight percent total polymer solids basis about 75 to and including 100 weight percent of polyurethane polymer and correspondingly from and including 0 up to about 25 weight percent of reactive curative;

cellulose material selected from the class consisting of hydroxy (lower alkyl) cellulose and alkali metal carboxylated (lower alkyl) cellulose; and at least one gel former selected from the class consisting of quaternized ethyl cellulose, and preformed gel comprised of water-swellable clay, peptizing agent and water;

said continuous aqueous phase comprising a preformed gel comprised of said water dispersed, film-forming, crosslinkable polyurethane polymer system, water swellable clay, peptizing agent and water, the viscosity of said continuous phase being less than the viscosity of said discontinuous phase; said multicolor paint having been prepared by the method of claim 1.

17. The multicolor paint of claim 16 wherein said polyurethane polymer system comprises a water dispersed polyurethane polymer which is:

(a) comprised of polymer molecules produced by polymerizing mainly monomers which are characterized by containing at least three functional groups per monomer, and wherein said functional groups are selected from the group consisting of isocyanato, hydroxyl, primary amino and secondary amino; and (b) self-crosslinkable when dried from an aqueous dispersion at ambient temperatures.

18. The multicolor paint of claim 16 wherein said polyurethane polymer system:

(a) comprises on a 100 weight percent total crosslinkable polymer solids basis a mixture of at least about 75 weight percent of a balance up to 100 weight percent thereof being a water dispersed reactive curative which is reactive with such polymer; and (b) is crosslinkable when dried from an aqueous dispersion at room temperatures.

19. The multicolor paint of claim 16 wherein said polyurethane polymer system comprises a water dispersed polymer system which is:

(a) characterized by containing a plurality of terminal isocyanato groups per molecule which are each blocked by an associated blocking agent, and said blocking agent is thermally released from substantially all its associated respective isocyanato groups at a temperature in the range of about 50° to about 150° C.; and (b) crosslinkable when dried from an aqueous dispersion and said blocking agent is so thermally released at said temperature.

20. The multicolor paint of claim 16 wherein at least one of said discontinuous aqueous phase and said continuous aqueous phase additionally contains:

(a) from and including 0 to about 45 weight percent on a 100 weight percent total phase basis of water dispersed carboxylated polymer which is substantially free from functional groups selected from the class consisting of hydroxyl, amino, and isocyanato; and (b sufficient water dispersed crosslinking agent selected from the group consisting of multifunctional carbodiimides and polyfunctional aziridines to crosslink said carboxylated polymer when said carboxylated polymer and said crosslinking agent are dried from an aqueous dispersion at room temperatures.

21. The multicolor paint of claim 16 wherein said cellulose material is hydroxy (lower alkyl) cellulose said water swellable clay is a synthetic sodium magnesium lithium hectorite clay, and said peptizing agent is tetrasodium pyrophosphate.

22. The multicolor paint of claim 16 wherein said discontinuous phase is comprised of at least two different classes of discrete gel bodies which respective classes differ from each other in color.

23. The multicolor paint of claim 16 wherein the weight ratio of said discontinuous aqueous phase to said continuous aqueous phase is in the range of about 1:1 to about 6:4.

24. The multicolor paint of claim 16 wherein said discontinuous aqueous phase has an average viscosity which is about 7 to about 8.5 times greater than the viscosity of said continuous aqueous phase.

25. The multicolor paint of claim 16 wherein said polyurethane polymer is an aliphatic polymer whose backbone polymer is selected from the class consisting of polyesters, polyethers, polycarbonates, and mixtures thereof.

26. A coating produced by applying a continuous layer of a multicolor paint of claim 16 to a surface and then drying said so applied layer.

27. A coating produced by applying a continuous layer of a multicolor paint of claim 24 to a surface and then drying of said so applied layer.

* * * * *